US012300086B2

(12) United States Patent
Kutzke et al.

(10) Patent No.: US 12,300,086 B2
(45) Date of Patent: May 13, 2025

(54) SYSTEM AND METHODS FOR PERSISTENT PASSIVE MONITORING

(71) Applicant: MotherBear, Inc., Woodbury, MN (US)

(72) Inventors: Demetrious T. Kutzke, Woodbury, MN (US); Harryel Philippeaux, Panama City Beach, FL (US)

(73) Assignee: MOTHERBEAR, INC., Maple Grove, MN (US)

( * ) Notice: Subject to any disclaimer, the term of this patent is extended or adjusted under 35 U.S.C. 154(b) by 17 days.

(21) Appl. No.: 18/170,775

(22) Filed: Feb. 17, 2023

(65) Prior Publication Data

US 2023/0267820 A1 Aug. 24, 2023

Related U.S. Application Data

(60) Provisional application No. 63/312,500, filed on Feb. 22, 2022.

(51) Int. Cl.
*G08B 21/18* (2006.01)

(52) U.S. Cl.
CPC .................................... *G08B 21/18* (2013.01)

(58) Field of Classification Search
CPC ... G08B 21/18; G08B 21/0423; G08B 25/016
See application file for complete search history.

(56) References Cited

U.S. PATENT DOCUMENTS 9,786,145 B2 * 10/2017 Oppenheimer .... G06K 7/10009
2006/0011146 A1 * 1/2006 Kates .................. A01K 15/021 119/859
2009/0009398 A1 * 1/2009 Taylor .................. H04W 4/021 342/451
2013/0173455 A1 * 7/2013 Adams .................... H04B 5/00 455/41.1
2015/0310716 A1 * 10/2015 East ...................... H04W 4/029 340/539.13
2016/0146495 A1 * 5/2016 Malve ..................... F24F 11/57 700/276

* cited by examiner

*Primary Examiner* — Rufus C Point
(74) *Attorney, Agent, or Firm* — Rothwell, Figg, Ernst & Manbeck, P.C.

(57) ABSTRACT

Systems and methods for monitoring of personal belongings and other devices. A mobile application may transmit a first message towards an embedded device, and the first message may include an instruction for the embedded device to transition to a passive state to monitor for a movement update of the embedded device. The mobile application may receive a second message from the embedded device, and the second message may include an indication that the embedded device has detected a movement update. The mobile application may publish an alert on a user interface relating to the experienced movement update. The embedded device may receive the first message from the mobile application, detect that the embedded device has experienced the movement update; and transmit the second message to the mobile application.

19 Claims, 4 Drawing Sheets

SYSTEM AND METHODS FOR PERSISTENT PASSIVE MONITORING

CROSS-REFERENCE TO RELATED APPLICATION

This application claims the benefit of priority to U.S. Provisional Application Ser. No. 63/312,500, filed on Feb. 22, 2022, which is incorporated herein by reference in its entirety.

BACKGROUND

Field of Invention

This disclosure relates to systems and methods that facilitate persistent passive monitoring of personal belongings and other devices.

Discussion of Background

A few commercial entities have introduced Internet of Things (IoT) products for tracking and wearable technologies. These products include Apple AirTag, Jiobit, Fi pet collar, and AirBolt, which provide active tracking capabilities. The AirTag is a small coin-sized smart tracker that ensures that people do not lose personal objects such as a wallet, key, purse, etc. The Jiobit provides geofencing or safe space functionality that triggers an alarm when breached by a Jiobit device. The Jeobit device also has an alarm button so that children can send an alarm signal to a parent. The Fi pet collar is built for pets and includes waterproofing and ruggedized materials for rough play and needs of pets. The Airbolt is designed for luggage tracking and travel.

These and similar monitoring devices with active tracking capabilities are touted as a way to keep track of personal belongings. More recently, however, bad actors have been using monitoring devices with active tracking capabilities for a host of crimes, ranging from stalking to car theft. Accordingly, embedded devices with tracking capabilities are currently being used in a manner that is harmful to consumers.

SUMMARY

More work needs to be done to mitigate the risks that monitoring devices will not be used for malicious purposes. Aspects of the present disclosure improve upon existing products through multi-modal behavior that easily switches between monitoring modes: passive and active. Taken together, the multi-modal behavior provides a unique solution that fills a gap left by alternative products. Passive mode ensures that a user has enhanced awareness around an object that should not move, such as a backpack or laptop when stepping away in a library to grab a coffee or take a phone call. Active mode tracks something and provides updates when something is guaranteed to move, like a pet or a child. This multi-modal behavior is easily controlled through an intuitive user interface (UI) on the mobile application.

Aspects of the present disclosure provide short duration passive monitoring, such as in academic libraries and coffee shops, where a user may want the ability to step away from one's desk for a brief moment without having to pack up one's personal belongings.

According to one aspect, a computer-implemented monitoring method performed by a mobile application is provided. The method may include transmitting a first message towards an embedded device, the first message comprising an instruction for the embedded device to transition to a passive state to monitor for a movement update of the embedded device. The method may include receiving a second message from the embedded device, the second message comprising an indication that the embedded device has detected a movement update. The method may include publishing an alert on a user interface relating to the experienced movement update.

According to another aspect, a monitoring system is provided. The monitoring system may include a processor and a non-transitory memory coupled to the processor, and the processor may be configured to perform the method. In another aspect, a computer program is provided, and the computer program may comprise instructions which when executed by a processor causes the processor to perform the method.

In yet another aspect, a computer-implemented method performed by an embedded device is provided. The method may include receiving a first message from an application, and the first message may include an instruction for the embedded device to transition to a passive state to monitor for a movement update of the embedded device. The method may include detecting that the embedded device has experienced a movement update. The method may include transmitting a second message to the application, and the second message may include an indication that the embedded device has detected the movement update.

In some aspects, a monitoring system is provided. The monitoring system includes an embedded device configured to perform the method.

BRIEF DESCRIPTION OF THE DRAWINGS

The accompanying drawings, which are incorporated herein and form part of the specification, illustrate various embodiments.

DETAILED DESCRIPTION

Aspects of the present disclosure relate to systems and methods that facilitate persistent passive monitoring of personal belongings and other devices.

Figure 1:
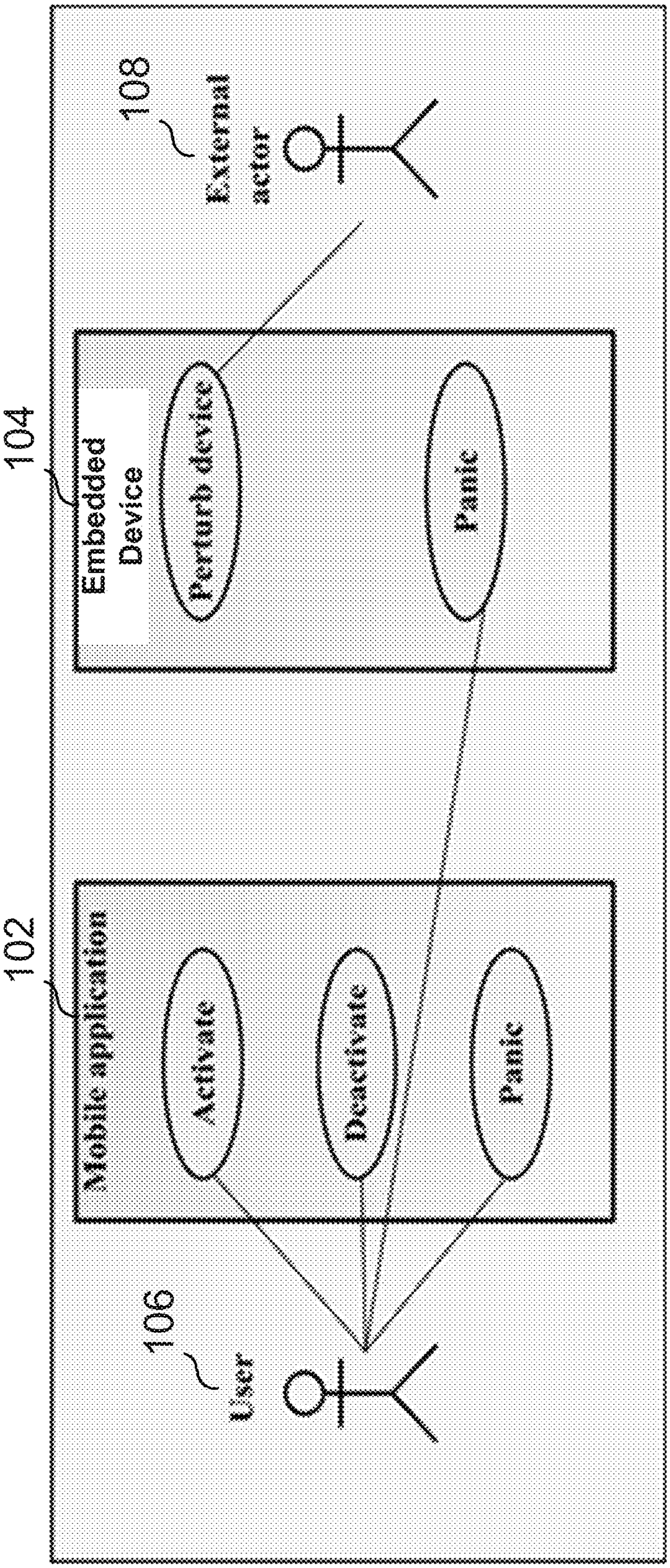
FIG. 1 illustrates a system diagram, according to some embodiments.

FIG. 1 illustrates a system diagram, according to some embodiments. FIG. 1 illustrates a user 106 operating a mobile application 102 operating on a mobile device. The mobile application is in electronic communication with an embedded device 104 that is embedded in a personal device or item. FIG. 1 further illustrates an external actor 108, which may perturb the personal device or item containing the embedded device 104.

Figure 2:
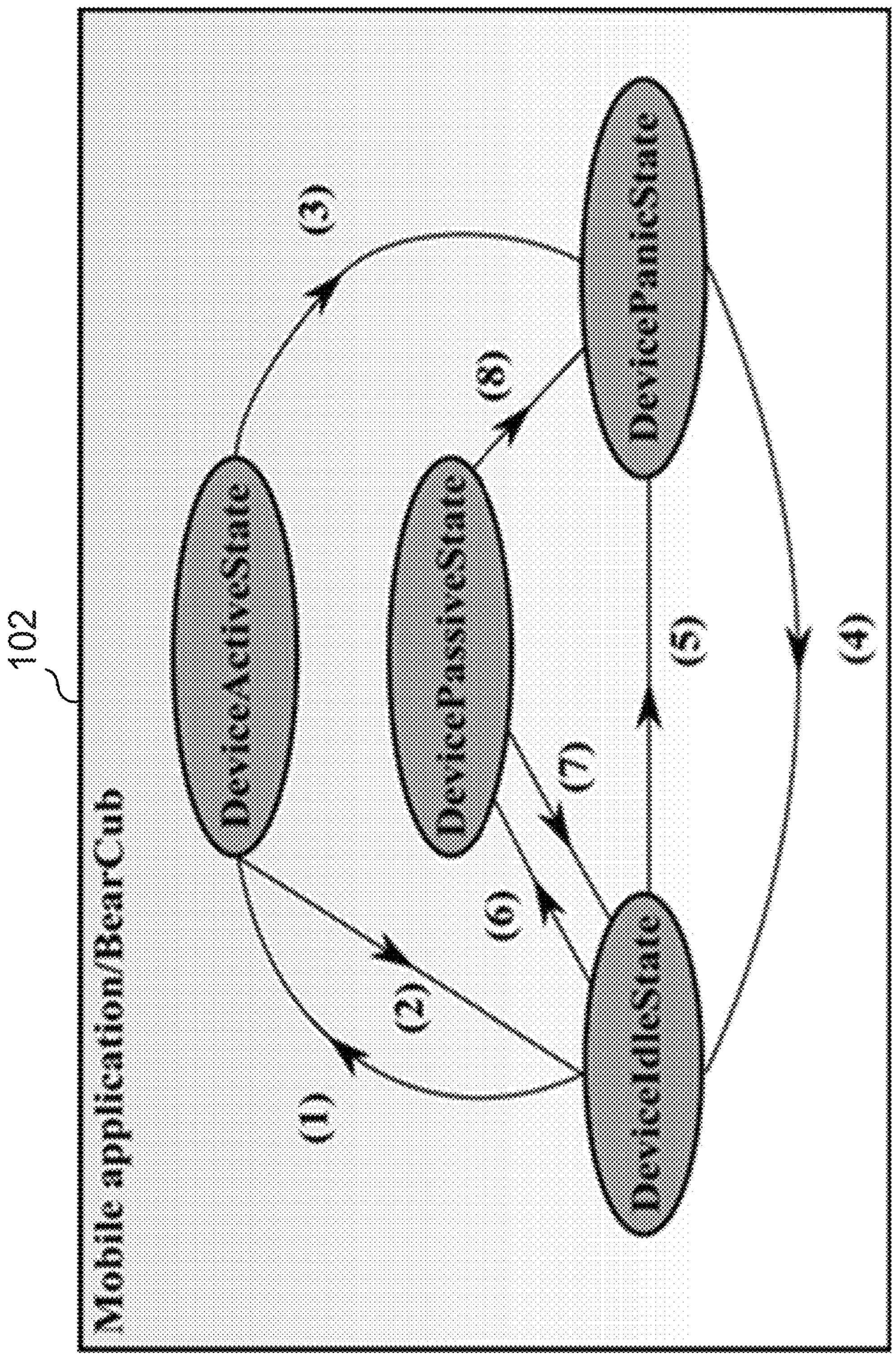
FIG. 2 illustrates a state transition diagram, according to some embodiments.

FIG. 2 illustrates a state transition diagram, according to some embodiments. FIG. 2 illustrates four states, labeled as ovals, which are synchronized between a mobile application 102 and the embedded device 104. A user 106 may control the states of the system through the mobile application UI. An arrow indicates a direction of flow between the states.

In some embodiments, there may be four primary states and eight permitted transitions. In the first transition, labeled as (1) in FIG. 2, the system moves from a DeviceIdleState to a DeviceActiveState, which establishes a heightened level of awareness. In some embodiments, DeviceActiveState may trigger the embedded device 104 to begin to continuously publish its GPS position updates, which are consumed by the mobile application 102.

In the second transition, labeled as (2) in FIG. 2, the system is reverted to an idle state, which reverses the continuous collection of position updates. Instead, the embedded device is placed in a low-power mode to conserve battery power. In the third transition, labeled as (3) in FIG. 2, the system moves from a heightened level of awareness to a DevicePanicState. DevicePanicState is an alert mode that triggers the embedded device 104 to sound an alarm or initiate some other action, and communicate when something bad has happened, such as unexpected movement. The panic state can also be triggered directly from the DeviceIdleState to sound an alarm on the embedded device 104, labeled as the fifth transition (5) in FIG. 1. In the fourth transition (4) in FIG. 2, the panic state is reversed, and the system is once again returned to a low-power state. Transitions six (6) and seven (7) move the system into and out of a DevicePassiveState, which triggers the embedded device 104 to listen for movement updates. When the accelerometer value changes by a threshold sensitivity and/or a threshold duration (e.g., a predetermined and hard-coded sensitivity and duration), then the system transitions from DevicePassiveState to DevicePanicState. The embedded device 104 publishes an alert that the embedded device 104 has been moved or disturbed, which is registered on the mobile application 102 and optionally triggers an alarm on both the mobile application 102 and/or the embedded device 104 itself.

These state transitions may be controlled through the mobile application 102.

Figure 3B:
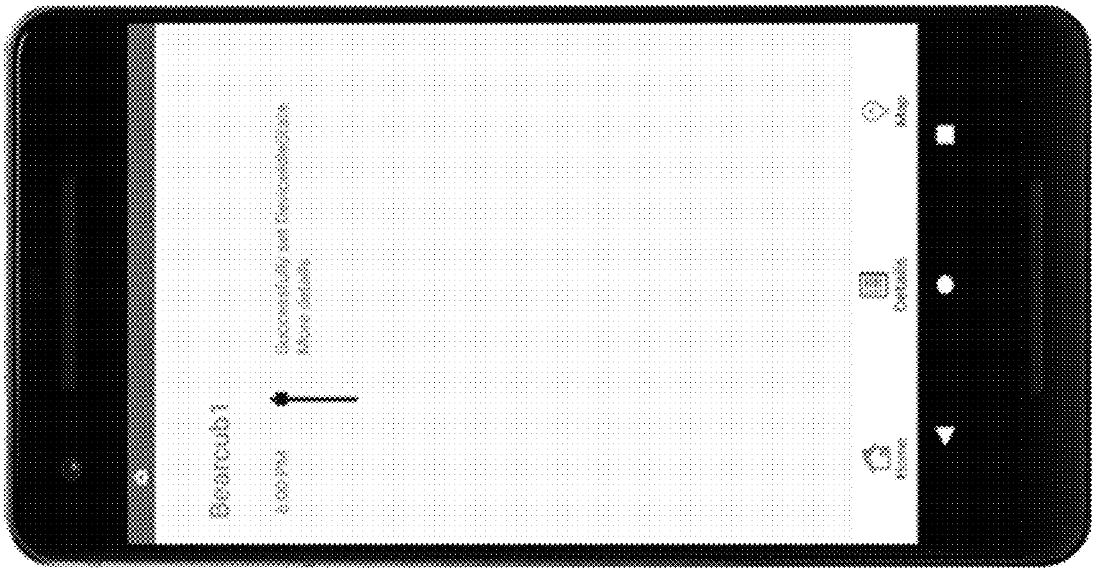
FIGS. 3A and 3B illustrate screen captures of a mobile application, according to some embodiments.
Figure 3A:
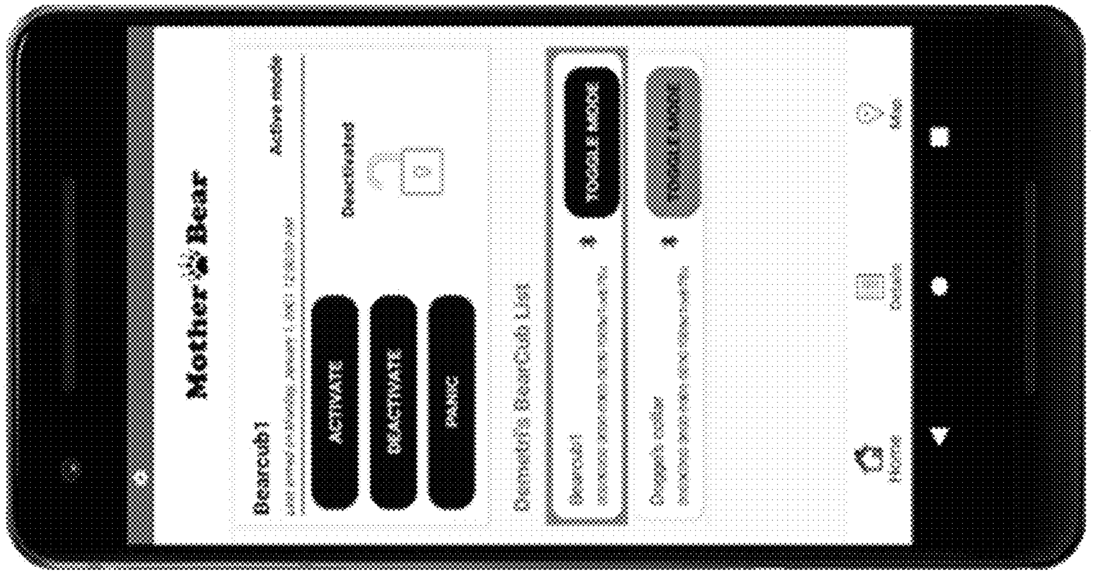

FIGS. 3A and 3B illustrate screen captures of the mobile application 102, according to some embodiments. In some embodiments, the mobile application may be designed, for example and without limitation, in Xamarin.Forms using a model-view viewmodel (MVVM) design pattern. Xamarin.Forms is a framework that allows platform agnostic user interface (UI) development. This allows developers to consolidate UI code into a single code repository and target different operating systems.

The user interacts with the system primarily through the three buttons shown in FIG. 3A. The button labeled "Activate," moves the system from a DeviceIdleState into a either a DevicePassiveState or a DeviceActiveState. These two states are differentiated by the expected functionality. As mentioned previously, the DevicePassiveState triggers the embedded device 104 to establish a callback function that utilizes built-in interrupt functionality. The interrupt utilizes a threshold δ mg and duration t ms to compute if the accelerometer readings have changed. If a change is registered, the update callback publishes an update on the internal state parameter, which is a simple character encoding scheme. Writing to the parameter value triggers a callback on the mobile application 102 to convert the internal state of the mobile application 102 to the panic state DevicePanicState.

The "Toggle Mode" button switches the flag for the transition, shown as "Active mode" in the upper right of the screen shown in FIG. 3A. The "Deactivate" button will move the system from either a DevicePanicState, DevicePassiveState, or DeviceActiveState into the DeviceIdleState. Finally, the button labeled "Panic" raises an alarm on both the embedded device 104 and the mobile application 102, moving the system into a DevicePanicState. With each press of a button, the history of the device is updated in a timeline for visualization, as shown in FIG. 3B.

Additionally, though not shown in FIGS. 3A and 3B, users may update the user profile, which includes basic information such as the user's first name and the ability to add additional embedded devices 104 (e.g., "BearCubs"). Additionally, a MapPage (not shown in FIGS. 3A and 3B), plots GPS data from the mobile application 102 and the embedded device 104 (if available). In the case that the GPS signal is lost, which is sometimes the case when inside a building, then the last known location may be plotted.

In some embodiments, the embedded device 104, also called a "BearCub," is built using, for example and without limitation, the PyCom Gpy development board, which includes four primary sensor and communication modules: an accelerometer, GPS transceiver, bluetooth low-energy (BLE) module, LTE-M module, and GPS module. The control code may be written, for example and without limitation, in Python. A user and an external actor can interact with a BearCub in two primary ways. First, the user can press the Panic button directly on the BearCub, which triggers an alarm. Second, an external actor can move the BearCub. If the device is in a DevicePassiveState then the entire system is placed in a DevicePanicState. This triggers the alarm as mentioned previously. If the BearCub is in a DeviceActiveState then essentially there is no discrimination between an external actor and the user, unless the panic button is pressed.

Figure 4:
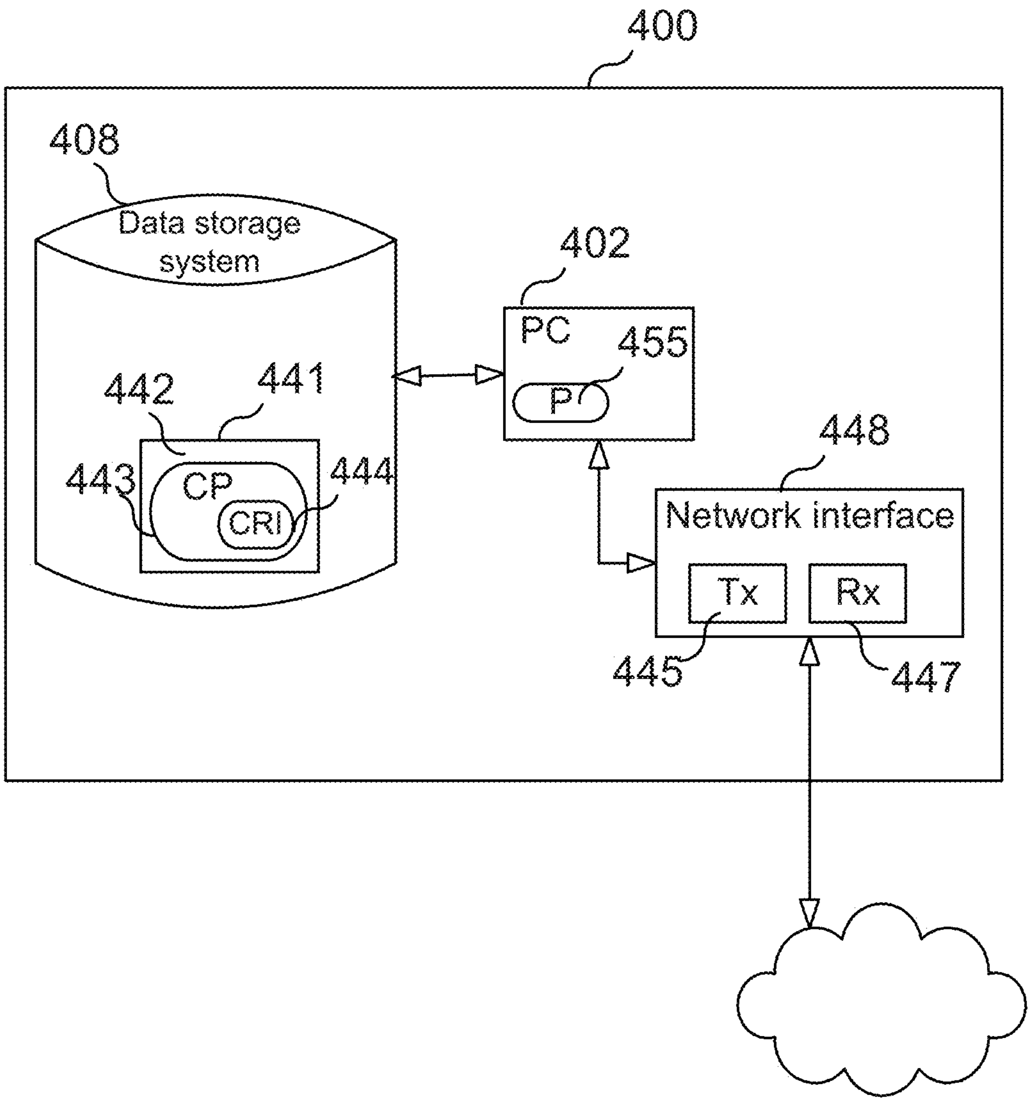
FIG. 4 is a block diagram of a computing system, according to some embodiments

FIG. 4 is a block diagram of a computing system 400, according to some embodiments. In some embodiments, computing system 400 may comprise the application 102 described above. As shown in FIG. 4, the system may comprise: processing circuitry (PC) 402, which may include one or more processors (P) 455 (e.g., one or more general purpose microprocessors and/or one or more other processors, such as an application specific integrated circuit (ASIC), field-programmable gate arrays (FPGAs), and the like); communication circuitry 448 for enabling the system to transmit data and receive data (e.g., transmit/receive data from a network and/or with the embedded device 104); and a local storage unit (a.k.a., "data storage system") 408, which may include one or more non-volatile storage devices and/or one or more volatile storage devices. In embodiments where PC 402 includes a programmable processor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes the system to perform steps described herein (e.g., steps described herein with reference to the flow charts). In other embodiments, the apparatus may be configured to perform steps described herein without the need for code. That is, for example, PC 402 may consist merely of one or more ASICs. Hence, the features of the embodiments described herein may be implemented in hardware and/or software.

Embodiments

A1. A computer-implemented monitoring method performed by a mobile application, the method comprising:

transmitting a first message towards an embedded device, the first message comprising an instruction for the embedded device to transition to a passive state to monitor for a movement update of the embedded device; receiving a second message from the embedded device, the second message comprising an indication that the embedded device has detected a movement update; and publishing an alert on a user interface relating to the experienced movement update.

A2. The method of embodiment Al, wherein the movement update comprises an indication that an accelerometer value of the embedded device has changed by a predetermined amount for a predetermined duration.

A3. The method of embodiment Al, further comprising: transmitting a third message towards the embedded device, the third message comprising an instruction to transition to an active state to monitor a GPS position of the embedded device.

A4. The method of embodiment Al, further comprising: transmitting a fourth message towards the embedded device, the fourth message comprising an instruction to sound an alarm on the embedded device.

A5. A monitoring system comprising: a processor; and a non-transitory memory coupled to the processor, wherein the processor is configured to perform the method of any one of embodiments A1-A4.

A6. A computer program comprising instructions which when executed by a processor causes the processor perform the method of any one of embodiments A1-A4.

B1. A computer-implemented method performed by an embedded device, the method comprising: receiving a first message from an application, the first message comprising an instruction for the embedded device to transition to a passive state to monitor for a movement update of the embedded device; detecting that the embedded device has experienced a movement update; and transmitting a second message to the application, the second message comprising an indication that the embedded device has detected the movement update.

B2. The method of embodiment B1, wherein the detecting comprises determining that an accelerometer value of the embedded device has changed by a predetermined amount for a predetermined duration.

B3. The method of embodiment B1, further comprising: receiving a third message from the application, the third message comprising an instruction to transition to an active state to monitor a GPS position of the embedded device; and monitoring a GPS position of the embedded device in response to the third message.

B4. The method of embodiment B1, further comprising: receiving a fourth message from the application, the fourth message comprising an instruction to sound an alarm on the embedded device; and sounding an alarm in response to the fourth message.

B5. A monitoring system comprising: an embedded device configured to perform the method of any one of embodiments B1-B4.

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is implicit that a step must follow or precede another step.

The invention claimed is:

1. A computer-implemented method performed by a user device comprising, the method comprising:
- displaying at least two interaction elements (IEs) on the screen of the user device, wherein said at least two IEs comprise:
  - a first IE for triggering an embedded device to transition to a first state; and
  - a second IE for triggering the embedded device to transition to a second state, which is different from the first state of the embedded device;
- detecting a user actuation of the first IE;
- based on detecting the user actuation of the first IE, transmitting a first message towards the embedded device, the first message comprising an instruction for the embedded device to transition to the first state, wherein the first state is a passive state for monitoring a movement update of the embedded device;
- after transmitting the first message towards the embedded device, receiving a second message from the embedded device, the second message comprising an indication that the embedded device has detected a movement update; and
- after receiving the second message from the embedded device, publishing an alert relating to the detected movement update on a user interface of the user device.

2. The method of claim 1, wherein the detected movement update comprises an indication indicating that an accelerometer value of the embedded device has changed by a threshold amount for a threshold duration.

3. The method of claim 1, further comprising:
- detecting a user actuation of the second IE that is for triggering the embedded device to transition to the second state, wherein the second state is an active state to monitor a global positioning system (GPS) position of the embedded device; and
- based on detecting the user actuation of the second IE, transmitting a third message towards the embedded device, the third message comprising an instruction to transition to the second state.

4. The method of claim 1, further comprising:
- detecting a user actuation of the second IE that is for triggering the embedded device to transition to the second state, wherein the embedded device is configured to sound an alarm in the second state; and
- based on detecting the user actuation of the second IE, transmitting a fourth message towards the embedded device, the fourth message comprising an instruction for the embedded device to sound an alarm on the embedded device.

5. The method of claim 4, wherein the method further comprises:

detecting a user actuation of a third IE that is for triggering the embedded device to transition to a third state, wherein the third state is an idle state in which the embedded device reduces its power consumption; and based on detecting the user actuation of the third IE, transitioning to the third state.

6. The method of claim 5, wherein the method further comprises:

based on detecting the user actuation of the first IE, updating a history of the embedded device and displaying the history updated based on detecting the user actuation of the first IE;

based on detecting the user actuation of the second IE, updating the history of the embedded device and displaying the history updated based on detecting the user actuation of the second IE; and based on detecting the user actuation of the third IE, updating the history of the embedded device and displaying the history updated based on detecting the user actuation of the third IE.

7. A computer-implemented method performed by an embedded device capable of transitioning between at least a first state, a second state, and a third state, wherein the first, second, and third states are different, the method comprising:

receiving a first message from a user device, the first message comprising an instruction for the embedded device to transition to the first state, wherein the first state is a passive state for monitoring a movement update of the embedded device;

based on receiving the first message from the user device, transitioning to the first state;

during the first state, detecting that the embedded device has experienced a movement update; and based on detecting that the embedded device has experienced the movement update, transmitting a second message to the user device, the second message comprising an indication that the embedded device has detected the movement update.

8. A user device comprising:

a screen;

a processor; and a non-transitory memory coupled to the processor, wherein the user device is configured to:

display at least two interaction elements (IEs) on the screen of the user device, wherein said at least two IEs comprise:

a first IE for triggering an embedded device to transition to a first state; and a second IE for triggering the embedded device to transition to a second state, which is different from the first state of the embedded device;

detecting a user actuation of the first IE;

based on detecting the user actuation of the first IE, transmit a first message towards the embedded device, the first message comprising an instruction for the embedded device to transition to the first state, wherein the first state is a passive state for monitoring a movement update of the embedded device;

after transmitting the first message towards the embedded device, receiving receive a second message from the embedded device, the second message comprising an indication that the embedded device has detected a movement update; and after receiving the second message from the embedded device, publish an alert relating to the detected movement update on a user interface of the user device.

9. The user device of claim 8, wherein the detected movement update comprises an indication indicating that an accelerometer value of the embedded device has changed by a threshold amount for a threshold duration.

10. The user device of claim 8, wherein the user device is further configured to:

detect a user actuation of the second IE that is for triggering the embedded device to transition to the second state, wherein the second state is an active state to monitor a global positioning system (GPS) position of the embedded device; and based on detecting the user actuation of the second IE, transmit a third message towards the embedded device, the third message comprising an instruction to transition to the second state.

11. The user device of claim 8, wherein the user device is further configured to:

detect a user actuation of the second IE that is for triggering the embedded device to transition to the second state, wherein the embedded device is configured to sound an alarm in the second state; and based on detecting the user actuation of the second IE, transmit a fourth message towards the embedded device, the fourth message comprising an instruction for the embedded device to sound an alarm on the embedded device.

12. The method of claim 7, wherein the embedded device is capable of transitioning between at least the first state, the second state, the third state, and a fourth state, the second state is an idle state in which the embedded device reduces its power consumption, the third state is a state in which the embedded device is configured to sound an alarm, and the fourth state is an active state to monitor a global positioning system (GPS) position of the embedded device.

13. The method of claim 12, wherein detecting that the embedded device has experienced the movement update comprises determining that an accelerometer value of the embedded device has changed by a threshold amount for a threshold duration.

14. The method of claim 12, further comprising:

receiving a third message from the user device, the third message comprising an instruction for the embedded device to transition to the second state, wherein the second state is an active state for monitoring a GPS position of the embedded device;

based on receiving the third message form the user device, transitioning to the second state; and during the second state, monitoring a GPS position of the embedded device.

15. The method of claim 12, further comprising:

receiving a fourth message from the user device, the fourth message comprising an instruction for the embedded device to transition to the second state, wherein, in the second state, the embedded device is configured to sound an alarm on the embedded; device;

based on receiving the fourth message, transitioning to the second state; and during the second state, sounding an alarm.

16. A monitoring system comprising:

an embedded device capable of transitioning between at least a first state, a second state, and a third state, wherein the first, second, and third states are different, the embedded device being configured to:

receive a first message from a user device, the first message comprising an instruction for the embedded device to transition to the first state, wherein the first state is a passive state for monitoring a movement update of the embedded device;

based on receiving the first message from the user device, transition to the first state;

during the first state, detect that the embedded device has experienced a movement update; and based on detecting that the embedded device has experienced the movement update, transmit a second message to the user device, the second message comprising an indication that the embedded device has detected the movement update.

17. The monitoring system of claim 16, wherein detecting that the embedded device has experienced the movement update comprises determining that an accelerometer value of the embedded device has changed by a threshold amount for a threshold duration.

18. The monitoring system of claim 16, wherein the embedded device is further configured to:

receive a third message from the user device, the third message comprising an instruction for the embedded device to transition to the second state, wherein the second state is an active state for monitoring a GPS position of the embedded device;

based on receiving the third message form the user device, transition to the second state; and during the second state, monitor a GPS position of the embedded device.

19. The monitoring system of claim 16, wherein the embedded device is further configured to:

receive a fourth message from the user device, the fourth message comprising an instruction for the embedded device to transition to the second state, wherein, in the second state, the embedded device is configured to sound an alarm on the embedded device;

based on receiving the fourth message, transition to the second state; and sound an alarm in response to the fourth message.

* * * * *